United States Patent Office 2,818,430
Patented Dec. 31, 1957

2,818,430

HYDROGENATION OF DICYCLODIENE DICARBOXYLIC ACIDS

Ober C. Slotterbeck, Rahway, Herbert K. Wiese, Cranford, and Addison W. Hubbard, Westfield, N. J., assignors to Esso Research and Engineering Company, a corporation of Delaware No Drawing. Application August 19, 1955
Serial No. 529,586

11 Claims. (Cl. 260—514)

This invention relates to an improved process for making hydrogenated dicyclodiene dicarboxylic acids such as dihydro- and tetrahydro dicyclopentadiene dicarboxylic acid and salts thereof.

Dicyclodiene dicarboxylic acids are well known materials. Their preparation is described, for instance, in a copending Wiese application, Serial No. 401,437, filed December 30, 1953, now U. S. Patent 2,781,397, patented February 12, 1957. In order to avoid duplication, the former application is incorporated herein by reference. By way of summary, however, let it suffice to indicate that the known method involves in essence, first, the reaction of finely divided metallic sodium with monomeric cyclodiene such as cyclopentadiene in the presence of an inert diluent such as xylene and a small amount of an activator such as anhydrous alcohol, second, the conversion of the resulting cyclodienyl sodium to the disodium salt of dicyclopentadiene dicarboxylic acid by treatment of the xylene solution with an excess of carbon dioxide, third, addition of water to form an aqueous solution of the disodium salt under inherently alkaline conditions, fourth, separation of the aqueous solution from the hydrocarbon phase, and lastly, acidification of the aqueous solution with sulfuric or other strong acid to spring and precipitate the free dicyclodiene dicarboxylic acid from the solution.

The resulting dicyclodiene dicarboxylic acid, which is usually a mixture of endo and exo isomers, has been found useful as a substitute for phthalic or maleic acids in a variety of reactions, as a starting material in the manufacture of polyester type lubricants and resins, and particularly in the manufacture of modified alkyd resins. However, in many of these uses, the dicyclopentadiene dicarboxylic acid has had various shortcomings. For instance, the previously known acids of this type have tended to undergo partial cracking, decarboxylation, as well as undesirable gellation when heated. As a result, products prepared therefrom by means of high temperature reactions have lacked uniformity and sometimes exhibited undesirably dark color.

The foregoing shortcomings have been alleviated to a varying extent by converting the dicyclodiene dicarboxylic acids into the corresponding hydrogenated derivatives as described in a copending Cohen application, Serial No. 510,561, filed May 23, 1955. The previously proposed method of preparing these hydrogenated derivatives generally involved dissolving the water-insoluble solid dicyclodiene dicarboxylic acid in a suitable organic solvent such as anhydrous ethanol, hydrogenation of the dissolved acid in the presence of a hydrogenation catalyst such as platinum, filtration to remove the catalyst, and recovery of the hydrogenated product by evaporation of the solvent.

However, this known preparation of the hydrogenated acids from the corresponding dicyclodiene acids has been rather cumbersome and the resulting products have tended to be somewhat off color and odoriferous, at least in part due to the properties of the dicyclodiene acids used as starting material.

It is the main object of the present invention to devise a simpler process for preparing the hydrogenated dicyclodiene dicarboxylic acids and to produce them in more nearly colorless and odorless form. A more specific object is to avoid the need for an extraneous organic solvent and the evaporation thereof at the end of the reaction. Still another object is to prepare the hydrogenated acids from the cyclodiene hydrocarbon feed by a process not requiring the isolation of the dicyclodiene dicarboxylic acid intermediates in solid form. These and other objects, as well as the nature, scope, operation and advantages of this invention will become more clearly apparent from the subsequent description and appended claims. In reading the description, it will be understood that all amounts, proportions and percentages of materials are expressed on a weight basis unless indicated otherwise.

It has now been discovered that the desired hydrogenated acids can be prepared in a surprisingly effective manner and in a high state of purity by hydrogenating an alkali metal salt of the corresponding dicyclodiene dicarboxylic acid while dissolved in water, and particularly in water at a carefully controlled hydrogen ion concentration. As a result, if desired, the alkali metal salt of the dicarboxylated dicyclodiene as prepared in its original synthesis by carboxylation of the cyclodienyl metal compound can be used directly in the hydrogenation, without springing the intermediate free diene acid, but simply by extracting the hydrocarbon dispersion of the carboxylated salt with water, preferably acidified water as hereafter explained, and hydrogenating the salt in the aqueous solution. After completion of the hydrogenation the dihydro- or tetrahydro-acid can be precipitated as a water insoluble solid by acidifying the aqueous salt solution and separated by filtration.

In brief, the invention is broadly useful in preparing dihydro- or tetrahydro-derivatives of dicyclopentadiene dicarboxylic acids which may be originally present either in the form of hydrocarbon dispersions of the corresponding metal salts or in the form of the solid, free acid. More specifically it is of particular interest in preparing dihydro- and tetrahydro-dicyclopentadiene-dicarboxylic acid, or their respective salts and esters, from the corresponding unsaturated sodium metal salt which can be represented for the present purposes by the following formula:

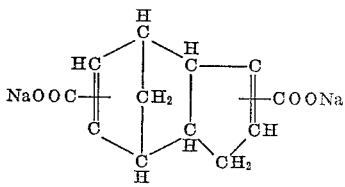

The exact position of the two carboxyl groups on the cyclodiene dimer molecule is not definitely known. Contrary to earlier literature references, recent work indicates that the carboxyl groups are attached to carbon atoms adjacent to the double bonds, one on each ring. Of course several isomers having such a structure are possible, although the sharp melting point of the product indicates the presence of an essentially pure isomer, rather than a mixture.

At any rate, the exact structure is of no particular importance in this invention which is broadly applicable to the hydrogenation of dimeric cyclodienes having one carboxyl group attached to each cyclodiene nucleus.

Of course, instead of using the sodium salt of the unsaturated acid, it is equally feasible to use in the hydrogenation any other water soluble salt, e. g. the potassium or lithium salt. The salt may initially be in the form of a dispersion in an inert hydrocarbon such as xylene, which is commonly used as a reaction medium in the synthesis of the salt from the original cyclodiene hydrocarbon, or the salt may be in solid form, obtained by filtering the original xylene slurry in an oxygen-free atmosphere, or the salt may be in the form of an aqueous solution best prepared by suspending the free dicarboxylated dicyclodiene acid in water and then adding dilute alkali to the suspension in an amount such that the pH of the aqueous solution is kept below about 7.5 or 8. When the salt is originally in the form of a hydrocarbon slurry, it, too, must be changed into an aqueous solution by extraction or mixing with water and separation of the insoluble organic liquid from the aqueous solution by decanting or the like. If the salt is used in the hydrogenation directly from the carboxylation step, without springing the free dicarboxylated dicyclodiene acid and reforming the salt, it is advisable to allow the salt to age for about 15 to 360 minutes at about 20 to 50° C., after dissolving in water, in order to insure that any monocarboxylated monocyclodiene acid salt is completely converted into the desired dimer form.

Obviously, in addition to the preparation of derivatives of dicyclopentadiene dicarboxylic acid proper, the invention is similarly applicable to the preparation of hydro derivatives of the corresponding lower alkyl homologues such as dimethyldicyclopentadiene dicarboxylic acid, i. e., the dicarboxylated dimer of methylcyclopentadiene, and methyldicyclopentadiene dicarboxylic acid, i. e., the mixed dimer of cyclopentadiene carboxylic acid and methylcyclopentadiene carboxylic acid.

The hydrocarbons, if any, in which the disodium salt of the dicyclodiene dicarboxylic acid may originally be suspended are those customarily employed in the synthesis of the acid and more particularly in the carboxylation of the cyclodienyl metal intermediate. Inert hydrocarbons boiling between about 110° and 165° C. such as xylene, toluene, benzene, cyclohexane, heptane, hexane, light naphthas, straight run mineral spirits are typical, as is already well known.

When making up the aqueous solution of the dicarboxylated dicyclodiene acid salt for the hydrogenation, whether by extraction of the organic slurry or by dissolving the separated salt, or by dissolving the free acid in alkaline water, it has been found particularly advantageous to maintain the hydrogen ion concentration of the alkali metal salt solution at a pH between about 5.8 and 7.5, both before and during the hydrogenation step. Since the alkali metal salt of the dicarboxylated dicyclopentadiene acid normally gives aqueous solutions characterized by a pH value in excess of 8 or even 11, the preferred embodiment of the invention requires the presence of suitable amounts of extraneous acid in the aqueous salt solution. This extraneous acid may be either a strong organic acid such as formic, acetic, propionic, trifluoroacetic, oxalic, etc., or a mineral acid such as sulfuric or phosphoric. Acidification with carbon dioxide or sulfur dioxide is also feasible, though somewhat less practical since it normally requires the use of pressure in order to bring the hydrogen ion concentration to the required value.

A particularly effective method of acidification involves adding an anhydrous acid such as glacial acetic acid directly to the hydrocarbon slurry of the dicarboxylated metal salt before an aqueous solution is made therefrom. However, it is also feasible to add the extraneous acid directly to the water phase, either before or after the dicarboxylated dicyclodiene metal salt is dissolved therein. The amount of extraneous acid required for the pH control may range from about 1 to 17 mole equivalents per 100 atoms of alkali metal present. The optimum amount of acid will vary somewhat from case to case, depending primarily on the particular homologue of dicyclodiene acid being treated, and can be readily determined by simple preliminary trial. For instance, the optimum pH value has been found to fall in the range between about 5.8 and 7.5 when treating the dimeric carboxyl derivatives of cyclopentadiene proper, whereas a somewhat higher pH value between about 7.0 and 7.5 has been found best for the derivatives of methylcyclopentadiene.

If no extraneous acid is added and the aqueous solution is hydrogenated under more alkaline conditions than the optimum indicated above, the product tends to be somewhat dark in color and malodorous, and therefore not so well suited for uses requiring light color and absence of odor. At the same time, however, it will be realized that hydrogenation of the aqueous salt solution at relatively alkaline conditions is feasible, gives useful products, and offers important process advantages over the previously known method involving hydrogenation of the acid in organic solvents. On the other hand, the use of unduly acid solutions is not desirable since this tends to cause precipitation of the solid, free acid and thus impairs effectiveness of the hydrogenation.

The aqueous solution used in the hydrogenation step of this invention may contain the alkali metal salt in a concentration of about 5 to 35 percent. Either the dihydrogenated or the tetrahydrogenated dicarboxylated dicyclodiene acids may be made therefrom, depending on whether the amount of hydrogen allowed to react is sufficient to hydrogenate one or both of the double bonds of the original diene acid molecule. Actually, even when the tetrahydro product is being prepared, the reaction proceeds in two distinct stages and formation of the tetrahydro compound normally does not begin until after the original dicyclodiene acid salt was completely converted to the dihydro derivative.

In producing the dihydro derivative it is advisable to keep the reaction temperature between about 20° and 70° C., preferably between about 40° and 60° C., in order to minimize cracking and production of the malodorous monomeric hydrogenated acid, i.e. cyclopentane carboxylic acid. The same temperature conditions are desirable in the initial stages even when production of the tetrahydro derivative is desired. That is, it is best to prepare first the dihydro derivative at the moderate temperatures indicated and then raise the temperature to about 100° to 200° C., in order to convert the dihydro to the tetrahydro derivative. While preparation of the tetrahydro derivative is possible at the same low temperature as that suitable for preparing the dihydro derivative, the rate of hydrogenation to the tetrahydro stage is very slow under those conditions. On the other hand, since the dihydro derivative itself is quite stable and not readily cracked, it is advantageous to carry out the second hydrogenation stage at a higher temperature as indicated above. Remembering that the exact position of the carboxyl groups has not been definitely established, the two hydrogenation stages can be illustrated by the following equations:

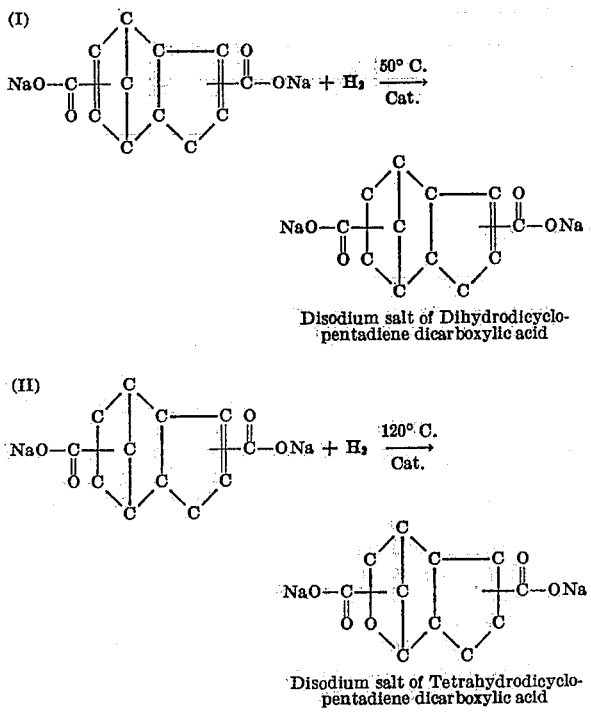

Of course, the reaction proceeds similarly when the corresponding derivatives of methylcyclopentadiene or the like are being treated.

The hydrogenation is carried out at hydrogen pressures which may range from about atmospheric to 2000 p. s. i. g. depending on the particular catalyst used, etc., preferably about 400 to 1000 p. s. i. g. with a nickel catalyst. A hydrogenation catalyst such as Adams platinum oxide, Raney nickel, nickel on a support such as alumina, silica, kieselguhr or activated carbon, cobalt, palladium, iron or generally metals of groups I-B and VIII of the periodic table, either in elemental form or as reducible oxides, are suitable for use in the present invention.

When a supported catalyst is used the aqueous salt solution can be passed over the catalyst countercurrent to the hydrogen. In such a process it then becomes unnecessary to filter off and recover suspended catalyst from the hydrogenated salt solution prior to springing the free acid therefrom. The catalyst may be used in an amount of about 0.5 to 25 percent expressed as elemental metal based on the dicarboxylated dicyclodiene salt.

Several specific examples will now be given for the purpose of illustrating the advantages of the invention and of further facilitating its practice by others, although it will be understood that the invention is not limited thereto.

EXAMPLES

In each case summarized in Table I the original dicarboxylated dicyclopentadiene feed used in the hydrogenation was prepared as follows:

150 g. of cyclopentadiene monomer was added dropwise to 46 g. of sodium dispersed in 600 ml. of xylene, activated with 3 ml. of 99% isopropyl alcohol. The temperature was maintained at 40° C. by intermittent cooling. In this manner a dispersion of cyclopentadienyl sodium in xylene was obtained.

The resulting cyclopentadienyl sodium was carboxylated by slowly adding, over a period of 90 minutes, the aforementioned cyclopentadienyl sodium dispersion to 1 liter of xylene kept saturated with $CO_2$ at essentially atmospheric pressure and $-20°$ C. The carboxylated cyclopentadienyl sodium slurry was then added to about 1500 ml. of water and the aqueous salt solution was separated from the organic xylene layer. For premium quality products it may also be advantageous to acidify the water with sulfuric or acetic acid or the like before addition of the organic salt slurry in order to keep the pH of the resulting aqueous salt solution in the preferred pH range of about 5.8 to 7 as described in copending application Serial No. 515,255, filed June 13, 1955.

In runs 1 and 3 the pH of the carboxylated salt solution was adjusted to 7.2 to 7.5 by the addition of a small amount of dilute sulfuric acid and the acidified solution was allowed to stand for four days at room temperature in order to make certain that the carboxylated cyclodiene salt was completely dimerized before it was used for hydrogenation. In runs 2 and 4 the hydrogenation feed consisted of the incompletely hydrogenated product from runs 1 and 3, respectively. In runs 5-8 the hydrogenation feed was obtained by first acidifying the aqueous salt solution with 50% $H_2SO_4$, filtering off the precipitated free dicarboxylic dicyclopentadiene acid, and neutralizing the solid acid with dilute sodium hydroxide to the pH value indicated in Table I. In run 9 the aqueous carboxylated dicyclodiene salt solution was used for hydrogenation immediately after its separation from the organic xylene layer, without any intervening aging or pH adjustment.

The hydrogenations were run in a 1.4-liter rocker bomb using 10% Raney nickel catalyst based on the dicarboxylic acid salt. In each case about 1000 g. of the aqueous salt solution, containing about 20 to 30% of the salt, were charged to the bomb, the catalyst was added, the bomb flushed with hydrogen, and then charged with hydrogen and heated under the conditions sepecified in Table I. Where only the dihydro derivative was desired, it was found that better control was obtained by heating the open bomb to reaction temperature before pressuring with hydrogen, since in this manner the hydrogen consumption could be followed more exactly than when the bomb was pressured at room temperature. At the end of the run the pressure was released, catalyst filtered off, and the filtrate acidified with 50% sulfuric acid to reduce the pH to about 3 to 4. The resulting precipitated free hydrogenated acid, which was taffy-like, was seeded to aid crystallization, filtered, washed with water, and dried.

The yield as well as acid and bromine numbers were determined, the amount of combined hydrogen was calculated, and product quality was also evaluated in terms of color and odor.

*Table I.—Hydrogenation of disodium salt of dicyclopentadiene dicarboxylic acid*

| Run No. | 1 | 2 | 3 | 4 | 5 |
|---|---|---|---|---|---|
| Feed | (b) | (c) | (b) | (d) | (e) |
| pH Salt feed | 7.2–7.5 | 7.3 | 7.2–7.5 | 7.3 | 6.8 |
| Reaction temp., °C | 50–60 | 150–165 | 45 | 93 | 45 |
| Pressure range, p. s. i. g | 1,460–1,240 | 1,500–1,700 | 1,465–1,350 | 1,485–1,440 | 1,400–1,330 |
| Contact time, hrs | 2.75 | 2.10 | 2.00 | 0.50 | 2.75 |
| Crystallization behavior (h) | Taffy hardens 15 mins. | Taffy hardens 10 mins. | Taffy hardens 30 mins. | Taffy hardens 30 mins. | Hard granules. |
| Color salt solution | Pale yellow | Pale yellow | Lt. brown | Pale yellow | Pale yellow. |
| Color dry acid | Off-white | Off-white | Off-white | Off-white | White. |
| Odor dry acid | Mild | Mild | Mild | Mild | Very slight. |
| Yield, wt. percent | 91 | 92 | 90 | 95 | 96. |
| Acid No., ceq./g | 0.859 | 0.845 | 0.887 | 0.882 | 0.867. |
| Percent of theoretical | 96.1 | 94.0 | 98.5 | 98.2 | 95.8. |
| Bromine No., cg. Br₂/g | 11.0 | 0.0 | 82.0 | 30.5 | 111.0. |
| Moles H₂ added/mole of dicyclopentadiene dicarboxylic acid | 1.93 | 2.00 | 0.90 | 1.60 | 0.50. |

| Run No. | 6 | 7 | 8 | 9 |
|---|---|---|---|---|
| Feed | (e) | (e) | (e) | (a) |
| pH Salt feed | 8.0 | 8.0 | 6.8 | 11.0 |
| Reaction temp., °C | 45 | 70 | 70 | 27–45 (g) |
| Pressure range, p. s. i. g | 1,320–1,250 | 1,400–1,305 | 1,405–1,305 | 1,400–1,160. |
| Contact time, hrs | 1.25 | 2.15 | 1.50 | 0.92 (g). |
| Crystallization behavior (h) | Taffy hardens 30 mins. | Taffy hardens 90 mins. | Taffy hardens 90 mins. | Taffy hardens 20 mins. |
| Color salt solution | Brown | Dark brown | Yellow | Brown. |
| Color dry acid | Lt. tan | Tan | Off-white | Lt. tan. |
| Odor dry acid | Strong | Strong | Moderate | Very strong. |
| Yield, wt. percent | 90 | 80 | 80 | 76.0. |
| Acid No., ceq./g | 0.881 | 0.879 | 0.880 | 0.880. |
| Percent of theoretical | 97.8 | 97.6 | 97.7 | 98.1. |
| Bromine No., cg. Br₂/g | 86.0 | 72.6 | 61.0 | 17.9. |
| Moles H₂ added/mole of dicyclopentadiene dicarboxylic acid | 0.80 | 1.00 | 1.20 | 1.75. |

(a) Na salt direct from carboxylation, not allowed to dimerize.
(b) Na salt direct from carboxylation, dimerized for 14 days.
(c) Acid from run 1 neutralized with dilute NaOH.
(d) Acid from run 3 neutralized with dilute NaOH.
(e) Free unhydrogenated acid neutralized with dilute NaOH.
(g) H₂ on bomb during warm-up to 45° C. Warm-up included in contact time given.
(h) Taffy-like products seeded to aid crystallization.

The data show the effectiveness of the present invention and particularly demonstrate the advantages in product quality when the hydrogenation is done at pH values below 7.5. Runs 2 and 4 illustrate the advantages of carrying the second hydrogenation stage at more elevated temperatures. Run 2 in particular shows the conversion of an incompletely hydrogenated product into a completely saturated one at temperatures above 150° C., without any unwanted side effects. On the other hand, if the hydrogenation is done at such a high temperature from the beginning, a malodorous, dark colored product will result due to cracking. In run 9 a low yield of poor quality product was obtained due to the presence of monomeric cyclopentadiene carboxylic acid in the feed. The resulting cyclopentane monocarboxylic acid is malodorous and, being substantially water soluble, accounts for the relatively poor yield of product subsequent to washing with water. However, this disadvantage can be avoided by aging the unsaturated salt at moderate temperatures, e. g. at 0° to 50° C., for a sufficient time to cause substantially complete dimerization of any monomeric salt prior to hydrogenation. This is illustrated in runs 1 and 3. Furthermore, any such difficulties are usually avoided altogether when the unsaturated carboxylic salt is first converted into free acid and the latter is redissolved in dilute alkali prior to the hydrogenation, as illustrated in runs 5–8.

The scope of the invention is particularly pointed out in the appended claims, especially when read with reference to and in the spirit of the foregoing description and the state of the art.

What is claimed is:

1. A process for hydrogenating a water soluble metal salt of a dicarboxylated dicyclopentadiene acid which comprises forming an aqueous solution of said salt adjusted to a pH value between about 5.8 and 7.5 and contacting the aqueous solution with hydrogen under pressure at a temperature below 70° C. in the presence of a hydrogenation catalyst until at least about one mole of hydrogen is reacted per mole of said salt.

2. A process for preparing hydrogenated derivatives of a dicarboxylated dicyclopentadiene acid which comprises forming an aqueous solution of an alkali metal salt of said acid, contacting said solution with hydrogen at an effective hydrogenation pressure in the range between 0 and 2000 p. s. i. g. in the presence of a hydrogenation catalyst at a temperature between about 20 and 70° C. until at least about one mole of hydrogen is reacted per mole of said salt, separating the catalyst from the aqueous solution, acidifying the catalyst-free solution to precipitate free hydrogenated dicarboxylated acid therefrom, and separating the precipitated acid from the solution.

3. A process according to claim 2 wherein the initial dicarboxylated acid is dimethyldicyclopentadiene dicarboxylic acid.

4. A process according to claim 2 wherein the initial dicarboxylated acid is dicyclopentadiene dicarboxylic acid.

5. A process according to claim 4 wherein the hydrogenation temperature is raised above 100° C. after about the first mole of hydrogen is reacted per mole of salt and the hydrogenation is continued at the increased temperature until about another mole of hydrogen is reacted per mole of salt.

6. A process according to claim 5 wherein the hydrogenation catalyst is Raney nickel.

7. A process according to claim 5 wherein the hydrogenation catalyst is nickel deposited on kieselguhr.

8. In combination with a process wherein cyclopentadiene is reacted with an alkali metal in the presence of an inert hydrocarbon diluent to form a hydrocarbon slurry of a cyclopentadienyl metal compound, and the cyclopentadienyl metal compound is carboxylated in the slurry with carbon dioxide to form a hydrocarbon slurry of a metal salt of dicyclopentadiene dicarboxylic acid, the improvement which comprises mixing the hydrocarbon slurry of the salt with extraneously acidified water to form an aqueous solution of said metal salt, the amount of extraneous acid added being sufficient to form an aqueous solution having a pH between 5.8 and 7.0 when mixed with said salt, separating the hydrocarbon diluent from the acidified aqueous salt solution, aging the separated aqueous salt solution until any monomeric carboxylic salt is dimerized, adding a hydrogenation catalyst to the aged aqueous solution, contacting said aqueous solution with hydrogen at an effective hydrogenation pressure in the range between about 400 and 2000 p. s. i. g. at a temperature between about 30° and 60° C. until about one mole of hydrogen is absorbed per mole of dissolved salt, then raising the temperature of the solution to about 100 to 200° C. and continuing the hydrogenation until the dissolved salt is substantially completely saturated, separating the catalyst from the solution, acidifying the solution to a pH of about 3 to 4 so as to precipitate free hydrogenated acid from the solution, and recovering said hydrogenated acid.

9. A process according to claim 8 wherein the extraneous acid is glacial acetic acid.

10. A process according to claim 8 wherein the extraneous acid is concentrated sulfuric acid.

11. A process for preparing hydrogenated dicarboxylic acids which comprises partially neutralizing solid dicyclopentadiene dicarboxylic acid with dilute alkali to form an aqueous solution having a pH value between about 5.8 and 7.5, contacting this solution in the presence of a nickel hydrogenation catalyst with hydrogen under a pressure of about 400 to 1000 p. s. i. g. at a temperature between about 30° and 60° C. until at least about one mole of hydrogen is absorbed per mole of dissolved salt, separating the catalyst from the reaction mixture, acidifying the remaining aqueous solution to a pH below 4 in order to precipitate free hydrogenated dicyclopentadiene dicarboxylic acid, and separating the precipitated acid from the solution.

References Cited in the file of this patent
UNITED STATES PATENTS

| | | |
|---|---|---|
| 1,877,991 | Schwenk | Sept. 20, 1932 |
| 2,675,390 | Rosenblatt | Apr. 13, 1954 |
| 2,688,627 | Cohen et al. | Sept. 7, 1954 |
| 2,716,662 | Cohen et al. | Aug. 30, 1955 |